Aug. 17, 1954     R. C. MANG     2,686,464
ROTARY CULTIVATOR
Filed Nov. 21, 1950     2 Sheets-Sheet 1
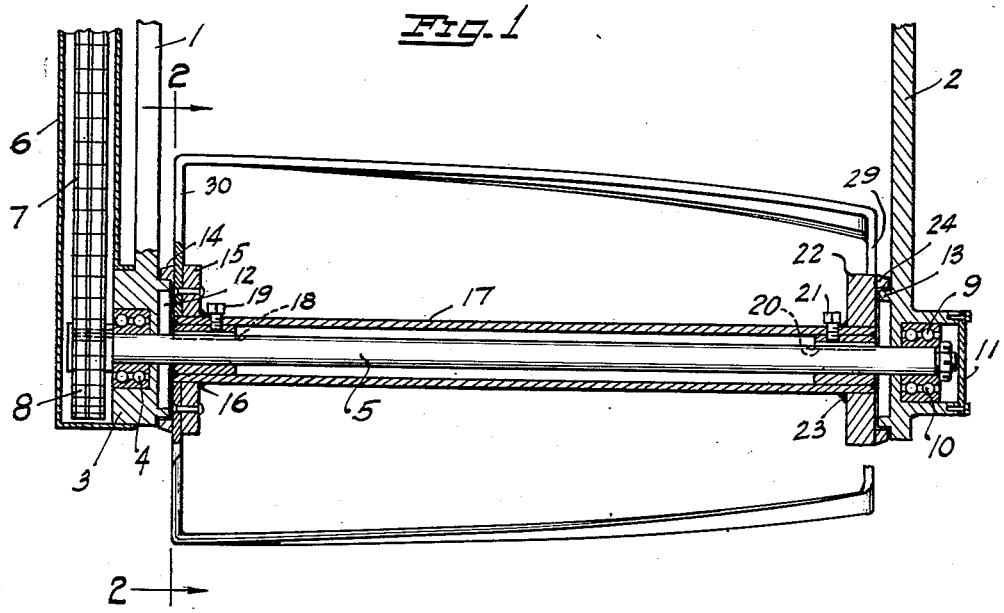
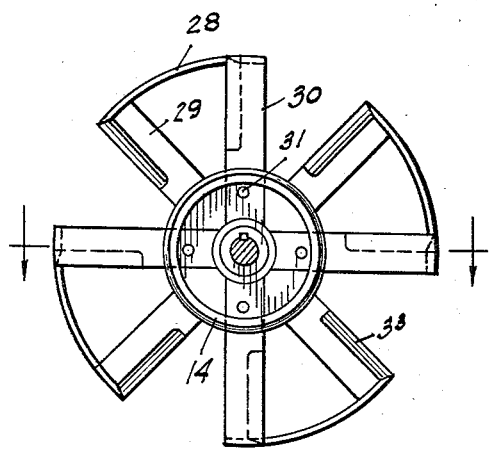
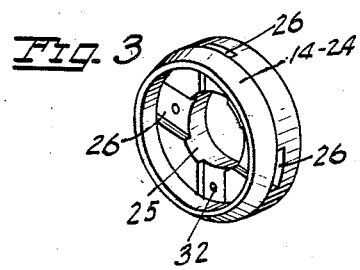
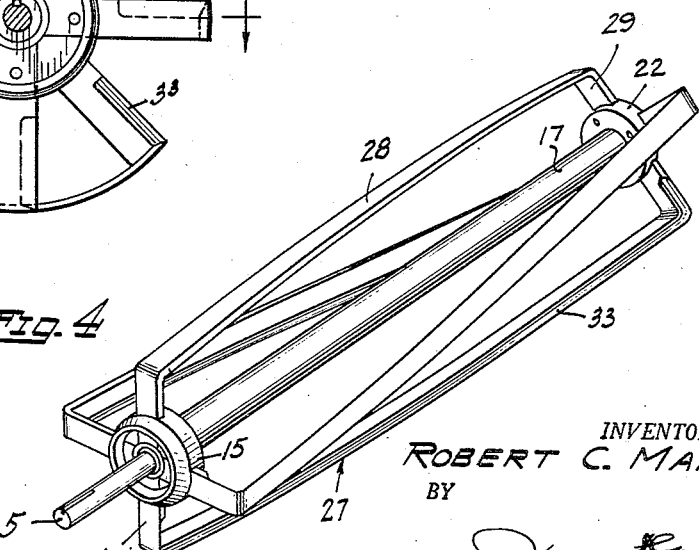
INVENTOR.
ROBERT C. MANG
BY
James L. Tivnan
ATT'Y Aug. 17, 1954  R. C. MANG  2,686,464
ROTARY CULTIVATOR
Filed Nov. 21, 1950  2 Sheets-Sheet 2

INVENTOR.
ROBERT C. MANG
BY
James D. Girnau
ATT'Y

Patented Aug. 17, 1954

2,686,464

UNITED STATES PATENT OFFICE 2,686,464

ROTARY CULTIVATOR

Robert C. Mang, Corvallis, Oreg., assignor of one-half to Otto A. Mang, Washington County, Oreg.

Application November 21, 1950, Serial No. 196,833

1 Claim. (Cl. 97—40)

This invention relates to improvements in garden implements and more especially to a power driven cultivating device of the rotary type.

It is one of the principal objects of the invention to provide a rotary cultivator which is of strong, durable and inexpensive construction, readily adaptable for attachment to tractors and the like and one which will operate efficiently with a minimum amount of power.

A further object is the provision of a cultivator of this kind embodying means for preventing the entanglement of weeds, grass and the like about the moving parts and especially the bearings of the cultivator.

A still further object is the provision of rotary cutting blades arranged in a new and novel manner so as to perform the cultivating operation by a slicing action instead of a chopping action as heretofore.

These and other objects will appear as my invention is more fully hereinafter described in the following specification, illustrated in the accompanying drawing and finally pointed out in the appended claim.

In the drawing:

Figure 1 is a sectional plan view of a rotary cultivator made in accordance with my invention.

Figure 2 is an end elevation taken approximately along the line 2—2 of Figure 1.

Figure 3 is a perspective detail view of a hub member.

Figure 4 is a perspective view of a rotary cutting element.

Figure 5:
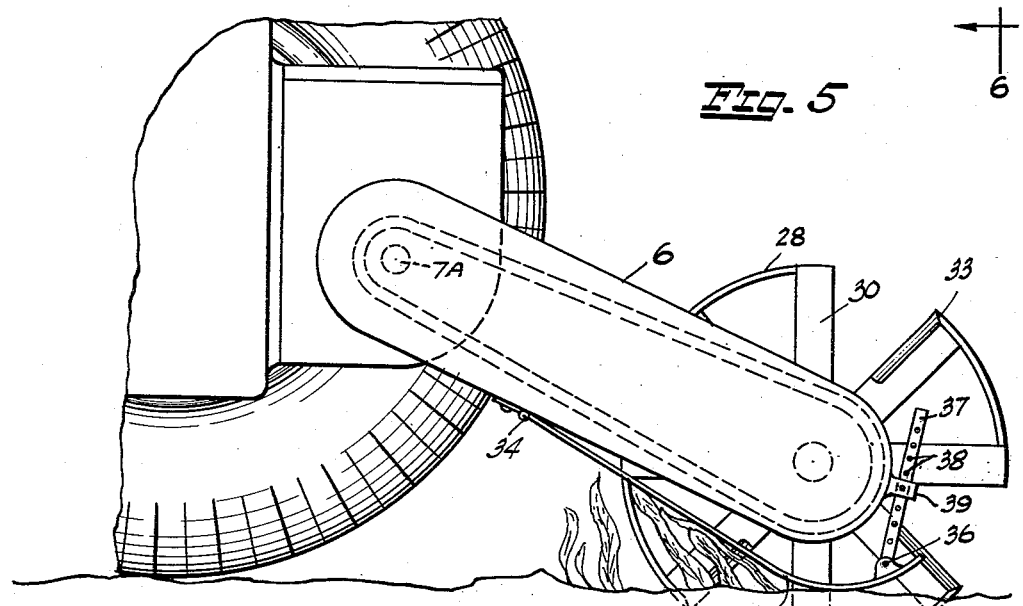
Figure 5 is a side elevation of the invention including a depth guage operatively applied thereto.
Figure 6:
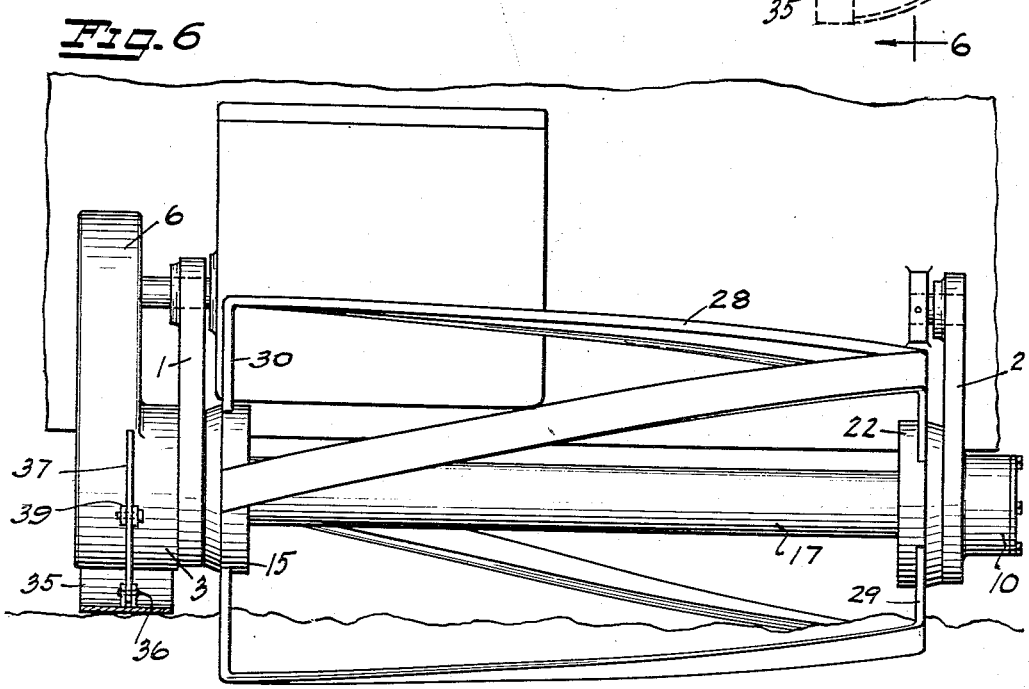
Figure 6 is an end view taken approximately along the line 6—6 of Figure 5.

Referring now more particularly to the drawing:

In Figure 1 reference numerals 1 and 2 indicate, generally, a pair of supporting beams pivotally attached at one of their ends by any suitable means to a tractor or other suitable towing vehicle (see Fig. 6).

The free end of the beam 1 is enlarged as at 3 to form a housing for a bearing 4 by means of which one end of a shaft 5 is rotatably mounted to the beam. To this enlarged end of the beam 1 is secured a housing 6 for enclosing a sprocket chain 7 operatively embracing a power take-off 7A carried by the tractor and also embracing a driven sprocket wheel 8 secured to one end of the shaft 5. The opposite end of said shaft is journaled within a bearing 9 mounted within a housing 10 carried by the free end of the beam 2 and closed by removable closure plate 11. The inner face of each free end of the beams 1 and 2 is formed with a ring 12 and 13 respectively. The ring 12 is surrounded by a ring 14 welded to a disc 15 which is welded as at 16 to a tubular shaft 17 which forms a housing for the shaft 5 and is secured to said shaft by means of a key 18 held in engagement with the shaft by means of a set screw 19. The opposite end of the tube 17 is likewise secured by means of a key 20 and set screw 21 to the shaft 5. This end of the tube is also provided with a disc 22 secured thereto by welding as indicated at 23. This disc is also provided with a ring 24 rotatably surrounding the ring 13 formed in the end of the beam 2.

The discs 15 and 22 are identical and, as best illustrated in Figure 3, each is formed with a central bore 25 and radially extending channels 26 arranged at right angles to each other. To each disc I secure a plurality of cutting blades, generally indicated at 27, each of which comprises a substantially horizontal center section 28 formed integral with downwardly extending end portions 29 and 30 which are riveted or bolted as at 31 to the discs 15 and 22 by means of apertures 32 formed in the channels of said discs and further secured to the discs by the rings 14—24 welded to the discs after the blades are in place. The leading inner edge 33 of each cutting blade is sharpened to a knife edge as is the major portion 34 of each right angular portion of each blade. By this arrangement the cutterhead when in rotation is provided with a horizontal cutting edge as well as a cutting edge of each end.

As best illustrated in Figures 2 and 4 the right angular end portions of each blade are spaced from each other on an angle of 45 degrees for the purpose of arranging the horizontal central cutting blade diagonally with respect to the main supporting axle 5.

To the underside of the chain housing 6 I hingedly mount, as at 34, one end of a shoe 35 whose opposite or trailing end is shaped as shown for contact with the ground being dealt with. To the outer end of the shoe I pivotally attach as at 36 a substantially vertical adjusting bar 37 apertured as at 38 for adjustable bolted connection with a lug 39 formed integral with the trailing end of the chain housing. By this arrangement the shoe may be locked at various vertically adjusted positions for regulating the depth of cut of the cutting blades and also to serve the purpose of pressing weeds and the like downwardly against the ground and away from the bearings of the shaft 5.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

A rotary cutterhead and supporting beams therefor comprising in combination, a pair of beams adapted at one of their ends for swingable attachment to a tractor, one of said beams being enlarged at its free end and having a bearing disposed therein, a chain housing secured at one of its ends to said enlarged end of the beam on the outside face thereof, the free end of the other of said beams having a bearing housing formed on the outside face thereof and closed by a closure plate, a bearing disposed within said bearing housing and aligned with the other of said bearings, a shaft rotatably mounted within said bearings and having one of its ends extending into said chain housing, a ring formed on the inside face of each of said free ends of the beams concentrically with said shaft, a tubular housing surrounding said shaft and secured at both of its ends to said shaft, a disc secured to each end of said shaft housing, each disc having radiating channels formed therein, a ring welded to each disc and partially covering said channels, each of said last mentioned rings rotatably surrounding said first mentioned rings by a working fit to form a seal between them, a plurality of U-shaped blades each having an elongated bight portion and pair of foreshortened legs each affixed to one of said discs in one of said channels formed therein, and said bight portions extending angularly with respect to said shaft, whereby said shaft, shaft bearings and the interior of said chain housing are sealed from the atmosphere.

References Cited in the file of this patent

UNITED STATES PATENTS

| Number | Name | Date |
|---|---|---|
| 228,653 | Lee | June 8, 1880 |
| 620,046 | Morrison et al. | Feb. 21, 1899 |
| 1,611,507 | Biddle | Dec. 21, 1926 |
| 1,614,356 | Foot | Jan. 11, 1927 |
| 1,744,597 | Vasconcellos | Jan. 21, 1930 |

FOREIGN PATENTS

| Number | Country | Date |
|---|---|---|
| 103,874 | Australia | May 3, 1938 |